United States Patent
Hefeeda et al.

(10) Patent No.: US 9,215,486 B2
(45) Date of Patent: Dec. 15, 2015

(54) SYSTEM AND METHOD FOR MULTIPLEXING OF VARIABLE BIT-RATE VIDEO STREAMS IN MOBILE VIDEO SYSTEMS

(75) Inventors: Mohamed Hefeeda, Surrey, CA (US); Cheng-Hsin Hsu, Mountain View, CA (US)

(73) Assignee: Simon Fraser University, Burnaby (CA)

( * ) Notice: Subject to any disclaimer, the term of this patent is extended or adjusted under 35 U.S.C. 154(b) by 344 days.

(21) Appl. No.: 13/816,704

(22) PCT Filed: Aug. 13, 2010

(86) PCT No.: PCT/CA2010/001262
§ 371 (c)(1),
(2), (4) Date: Apr. 25, 2013

(87) PCT Pub. No.: WO2012/019272
PCT Pub. Date: Feb. 16, 2012

(65) Prior Publication Data
US 2013/0219446 A1    Aug. 22, 2013

(51) Int. Cl.
*H04N 21/262*    (2011.01)
*H04L 29/06*    (2006.01)
(Continued)

(52) U.S. Cl.
CPC .......... *H04N 21/262* (2013.01); *H04L 65/4015* (2013.01); *H04L 65/605* (2013.01); *H04N 21/23655* (2013.01); *H04N 21/2402* (2013.01); *H04N 21/64315* (2013.01); *H04N 21/8456* (2013.01); *H04W 28/065* (2013.01); *H04W 72/1252* (2013.01)

(58) Field of Classification Search
None
See application file for complete search history.

(56) References Cited

U.S. PATENT DOCUMENTS 5,737,747 A * 4/1998 Vishlitzky et al. ............ 711/118
5,938,734 A * 8/1999 Yao ..................... H04N 7/17336
                                                                     348/E5.008

(Continued)

FOREIGN PATENT DOCUMENTS

WO    2006/135710 A2    12/2006
WO    2007/010131 A2    1/2007

(Continued)

OTHER PUBLICATIONS

ISR/WO issued in respect of the corresponding PCT application PCT/CA2010/001262 dated May 17, 2011, 9 pages.

(Continued)

*Primary Examiner* — Steve Young
(74) *Attorney, Agent, or Firm* — Seed IP Law Group PLLC (57) ABSTRACT

A method of transmitting a live video stream and a pre-recorded video stream over a wireless network to a mobile device, the method including: receiving the live video stream and the pre-recorded video stream for a current scheduling window; dividing the live video stream and the pre-recorded video stream into segments in the current scheduling window, each segment including an aggregate data amount, a transmission start time and a transmission end time; determining a transmission schedule for the current scheduling window, said transmission schedule including the segments; locating slack time slots, the slack time slots being time slots for which no segment is allocated; and scheduling bursts associated with the pre-recorded video stream in the slack time slots.

20 Claims, 6 Drawing Sheets

(51) Int. Cl.
*H04N 21/2365* (2011.01)
*H04N 21/24* (2011.01)
*H04N 21/643* (2011.01)
*H04N 21/845* (2011.01)
*H04W 28/06* (2009.01)
*H04W 72/12* (2009.01)

(56) References Cited

U.S. PATENT DOCUMENTS

| | | | |
|---|---|---|---|
| 6,044,396 A | 3/2000 | Adams | |
| 6,195,368 B1 * | 2/2001 | Gratacap | H04N 21/23424 370/412 |
| 7,080,392 B1 * | 7/2006 | Geshwind | 725/34 |
| 7,885,270 B2 | 2/2011 | Frink et al. | |
| 7,924,876 B2 | 4/2011 | Rezaei et al. | |
| 8,000,395 B2 | 8/2011 | Yousef | |
| 8,151,305 B2 | 4/2012 | Doerr et al. | |
| 8,774,600 B2 * | 7/2014 | Mirsky | H04N 21/2221 386/248 |
| 2004/0267955 A1 | 12/2004 | Konetski et al. | |
| 2006/0064716 A1 * | 3/2006 | Sull et al. | 725/37 |
| 2007/0104105 A1 * | 5/2007 | MeLampy et al. | 370/235 |
| 2008/0008190 A1 | 1/2008 | Elstermann | |
| 2008/0112315 A1 | 5/2008 | Hu et al. | |
| 2009/0175356 A1 | 7/2009 | Hagemeier et al. | |
| 2009/0279852 A1 * | 11/2009 | Morimoto et al. | 386/95 |
| 2009/0313382 A1 * | 12/2009 | Bouazizi | 709/231 |
| 2010/0054268 A1 | 3/2010 | Divivier | |
| 2010/0195974 A1 * | 8/2010 | Zheng et al. | 386/68 |

FOREIGN PATENT DOCUMENTS

| | | |
|---|---|---|
| WO | 2007/140066 A2 | 12/2007 |
| WO | 2008/005750 A2 | 1/2008 |
| WO | 2009/007261 A2 | 1/2009 |

OTHER PUBLICATIONS

X. Yang, et al., Performance analysis of time slicing in DVB-H. In Proc. of Joint IST Workshop on Mobile Future and Symposium on Trends in Communications (SympoTIC'04), pp. 183-186, Bratislava, Slovakia, Oct. 2004.

Digital Video Broadcasting (DVB); DVB-H implementation guidelines. European Telecommunications Standards Institute (ETSI) Standard EN 102 377 Ver. 1.3.1, May 2007, 118 pages.

T. Lakshman, et al., VBR video: Tradeoffs and potentials. Proc. of the IEEE, 86(5):952-973, May 1998.

M. Rezaei, et al., Joint video coding and statistical multiplexing for broadcasting over DVB-H channels. IEEE Transactions on Multimedia, 10(8):1455-1464, Dec. 2008.

P. Chou, Streaming media on demand and live broadcast. In M. van der Schaar and P. Chou, editors, Multimedia Over IP and Wireless Networks, chapter 14, pp. 453-502. Academic Press, Mar. 2007.

M. Tagliasacchi, et al., Minimum variance optimal rate allocation for multiplexed H.264/AVC bitstreams. IEEE Transactions on Image Processing, 17(7):1129-1143, Jul. 2008.

Z. He et al., Linear rate control and optimum statistical multiplexing for H.264 video broadcast. IEEE Transactions on Multimedia, 10(7):1237-1249, Nov. 2008.

M. Jacobs, et al., Statistical multiplexing using SVC. In Proc. of IEEE International Symposium on Broadband Multimedia Systems and Broadcasting (BMSB'08), pp. 1-6, Las Vegas, NV, Mar. 2008.

J. Ribas-Corbera, et al., A generalized hypothetical reference decoder for H.264/AVC. IEEE Transactions on Circuits and Systems for Video Technology, 13(7):674-687, Jul. 2003.

H. Lai, et al. A monotonic-decreasing rate scheduler for variable-bit-rate video streaming. IEEE Transactions on Circuits and Systems for Video Technology, 15(2)221-231, Feb. 2005.

J. Lin, et al., FOS: A funnel-based approach for optimal online traffic smoothing of live video. IEEE Transactions on Multimedia, 8(5):996-1004, Oct. 2006.

P. Camarda, et al., A smoothing algorithm for time slicing DVB-H video transmission with bandwidth constraints. In Proc. of ACM International Mobile Multimedia Communications Conference (MobiMedia'06), Alghero, Italy, Sep. 2006, 5 pages.

L. Wang, et al., Joint rate control for multi-program video coding. IEEE Transactions on Consumer Electronics, 42 (3):300-305, Aug. 1996.

M. Rezaei, et al., Implementing statistical multiplexing in DVB-H. International Journal of Digital Multimedia Broadcasting, Apr. 2009, 15 pages.

C. Hsu, et al., On Statistical Multiplexing of Variable-Bit-Rate Video Streams in Mobile Systems, Oct. 19-24, 2009, Beijing, China, pp. 411-420.

* cited by examiner

SYSTEM AND METHOD FOR MULTIPLEXING OF VARIABLE BIT-RATE VIDEO STREAMS IN MOBILE VIDEO SYSTEMS

TECHNICAL FIELD

The present disclosure relates to transmission of multiple streaming videos over a network, and more particularly to streaming such videos to mobile devices.

BACKGROUND

Increasingly users of mobile devices, such as laptops, Personal Digital Assistants (PDAs), smart phones, and Portable Media Players (PMPs), are watching videos streamed over wireless networks to such devices. When the streaming rates of such videos are high, and the number of mobile devices on the network is large, streaming videos using unicast transmissions may overload the wireless network. In contrast, streaming videos from a base station using one-to-many multicast or broadcast service can support many more mobile devices. Wireless networks that support multicast or broadcast transmission are referred to herein as broadcast networks. Such broadcast networks include WiMAX networks, Multimedia Broadcast Multicast Services (MBMS) cellular networks, and mobile TV broadcast networks such as Digital Video Broadcast-Handheld (DVB-H), MediaFLO (Forward Link Only), and Advanced Television Systems Committee (ATSC) mobile DTV networks.

A typical broadcast network includes three entities: content providers; network operators; and mobile devices. Content providers are the entities that create and/or distribute the videos. Network operators are the entities that manage base stations and provide services to users of mobile devices. A network operator multiplexes several videos into a broadcast stream, and transmits the broadcast stream over a broadcast network with a fixed bandwidth.

Streaming videos are usually encoded in Variable-Bit-Rate (VBR), rather than Constant-Bit-Rate (CBR) for better video quality, shorter delay, and higher statistical multiplexing gain. Because the broadcast network has limited bandwidth, a multiplexer must ensure that the bit rate of the broadcast stream does not exceed the network bandwidth. One way to control the bit rate is to employ joint video coders, which encode multiple videos and dynamically allocate available network bandwidth among them, so that the aggregate bit rate of the coded video streams never exceeds the network bandwidth. A joint video coder includes a joint rate allocator, several decoders, and several VBR coders. Broadcast networks with joint video coders are referred to herein as closed-loop broadcast networks. Joint video coders are not always present in broadcast networks, because of a high deployment cost. Such broadcast networks with standalone video coders are referred to herein as open-loop broadcast networks.

As mobile devices are battery powered, energy consumption is important to user experience, since higher energy consumption leads to a shorter viewing time. Therefore, broadcast networks need to implement some energy saving techniques. A common technique is to cause the base station to send each video stream in bursts at a bit rate higher than the encoding rate of the video. This is referred to as time slicing in broadcast network standards. The base station determines the next burst time and includes that information in the header fields of each burst. Time slicing enables the mobile devices to receive a burst of traffic, and then put their receiving circuits into sleep until the next burst in order to save energy. While time slicing allows mobile devices to save energy, multiplexers must carefully compose burst schedules, which specify the start time of each burst and its size, in order to maintain good service quality.

The energy saving of mobile devices in broadcast networks that send videos in bursts has been considered. For example, the European Telecommunications Standards Institute (ETSI) DVB-H Guidelines disclose that streaming videos in bursts enables mobile devices to put their receiving circuits into sleep for a significant fraction of time.

Streaming VBR videos in the Internet is challenging. Several smoothing algorithms have been proposed, including the absorption of bit rate variations of a VBR stream by adding buffers at both sender and receiver, and computing a CBR transmission schedule that results in no buffer violation instances. Such smoothing algorithms are based on the leaky bucket algorithm, and the assumption that packets are small. While the packet size assumption holds in the Internet, broadcast networks transmit videos in much larger bursts to save energy.

A number of scheduling algorithms require the administrator of a broadcast network to manually set certain parameters (e.g. the time slot size, which is used in many current multiplexers in the market). Such systems tend to be error-prone and do not yield optimal performance.

Many commercial multiplexers implement two burst scheduling schemes: slotted and dynamic scheduling. Network operators use variations of these two schemes to broadcast VBR streams. These schemes may need manual configuration of multiple parameters, and they do not produce optimal schedules in terms of energy saving for mobile devices and bandwidth utilization of the wireless spectrum.

SUMMARY

In an aspect there is provided a method of transmitting a live video stream and a pre-recorded video stream over a wireless network to a mobile device, the method comprising: receiving the live video stream and the pre-recorded video stream for a current scheduling window; dividing the live video stream and the pre-recorded video stream into segments in the current scheduling window, each segment including an aggregate data amount, a transmission start time and a transmission end time; determining a transmission schedule for the current scheduling window, said transmission schedule including the segments; locating slack time slots, the slack time slots being time slots for which no segment is allocated; and scheduling bursts associated with the pre-recorded video stream in the slack time slots.

In another aspect there is provided a method of scheduling a plurality of video streams for transmission over a wireless network to a mobile device, including: a) receiving said plurality of video streams; b) for each of said video streams s generating a plurality of segments p for video stream s, and calculating (i) an aggregate data amount to be received in said segment, (ii) a start time for said segment; and (iii) an end time for said segment; c) placing said start time and end time for each of said segments in a queue, said queue sorted by time order; c) for each decision point in said queue: c.1) at a current time, if there is no segment that has a start time earlier than the current time, and an end time later than the current time, then placing a slack time slot on a slack time list; else c.2) scheduling a burst from said current time to a second time, for a video stream s, wherein a segment of said stream s has the smallest end time among all segments for said stream s having a start time before the current time, and an end time later than the current time; c.3) and if a segment is not complete or is late allocating a burst to stream s associated with said incomplete segment to a slot on said slack time list; and d) returning a burst schedule for a scheduling window.

In general, the present embodiments provide an integrated method for transmitting pre-recorded and live video streams.

DRAWINGS

The following figures set forth embodiments of the invention in which like reference numerals denote like parts. Embodiments of the invention are illustrated by way of example and not by way of limitation in the accompanying figures.

DETAILED DESCRIPTION OF EMBODIMENTS

Figure 1:
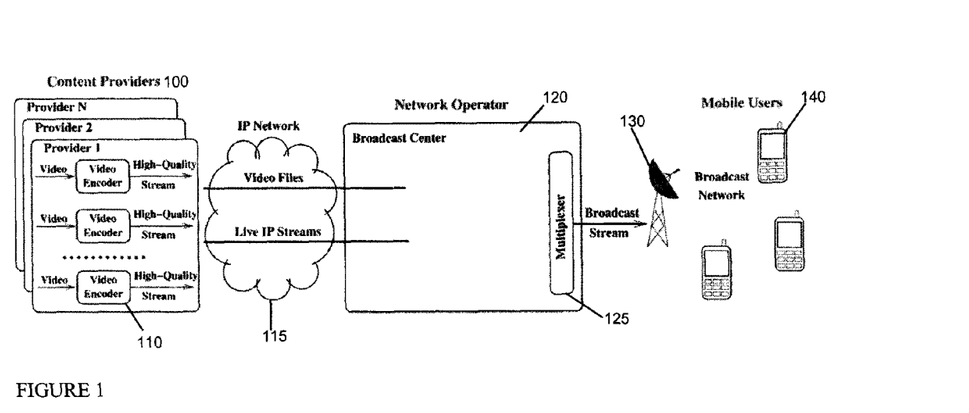
FIG. 1 is an example of a broadcast network in which the system according to the invention may be implemented.

The environment in which the system and method according to embodiments may be used is seen in FIG. 1. Content providers 100, i.e. entities that provide or create videos, use video encoders 110, to encode such videos in a high quality stream, and through IP network 115, communicate either a video file or a streaming video file to a base station 120. Base station 120 in turn, can communicate the video file or streaming video to a number of mobile devices 140 through a broadcast network 130. Multiplexer 125, at base station 120, determines the output of the video files for streaming to mobile devices 140.

Figure 3:
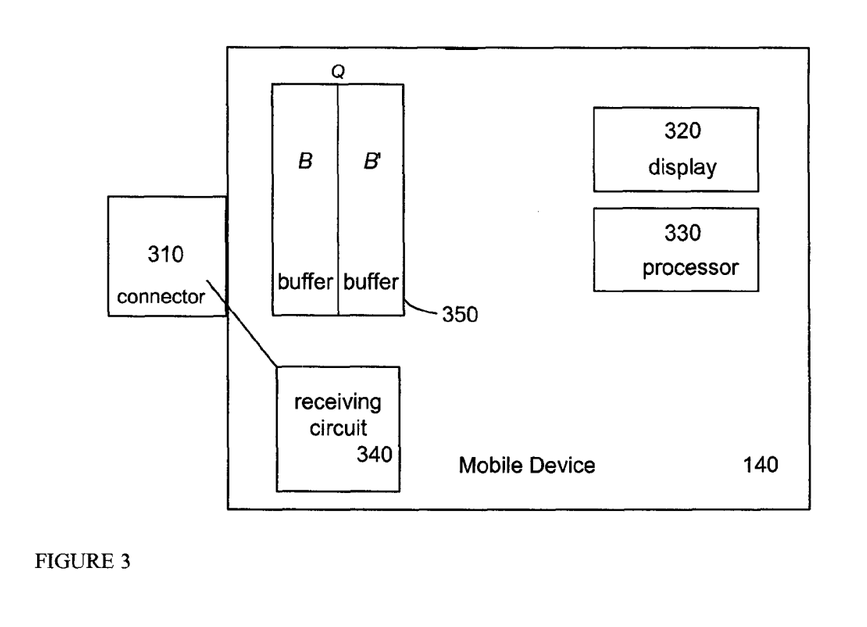
FIG. 3 is a block diagram of a mobile device according to the invention.

Mobile device 140 is shown in FIG. 3. Mobile device 140 may be a laptop, notebook, cellular phone, telephone, smart phone, PMP, PDA, or other portable device capable of viewing videos and having means by which to receive such videos over a broadcast network. Mobile device 140 includes a connector 310, such as an antenna, by which it communicates with broadcast network 130, a display 320, a processor 330 and receiving circuits 340. Mobile device 140 also includes a receiving buffer 350 having a capacity designated by Q, which can be divided into B and B'.

Figure 2A:
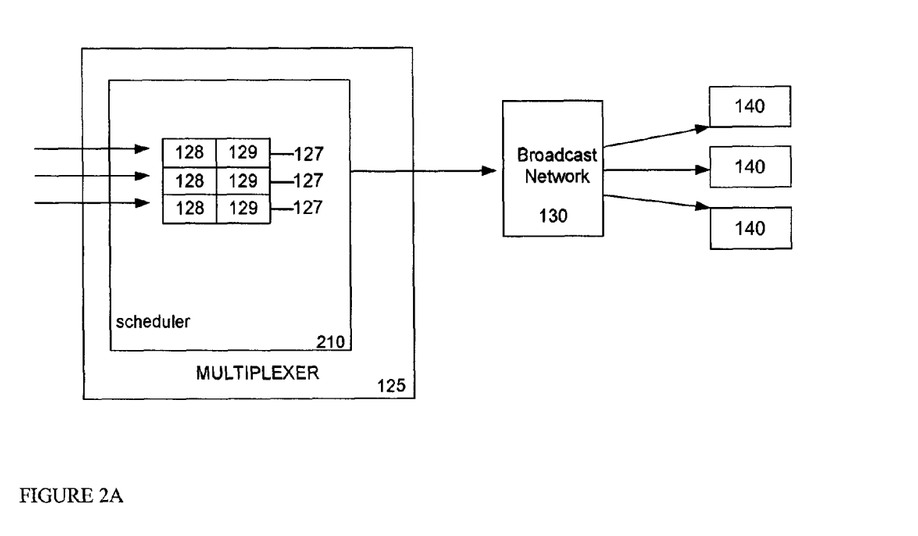
FIG. 2A is a block diagram of a multiplexer according to the invention in communication with mobile devices.
Figure 2B:
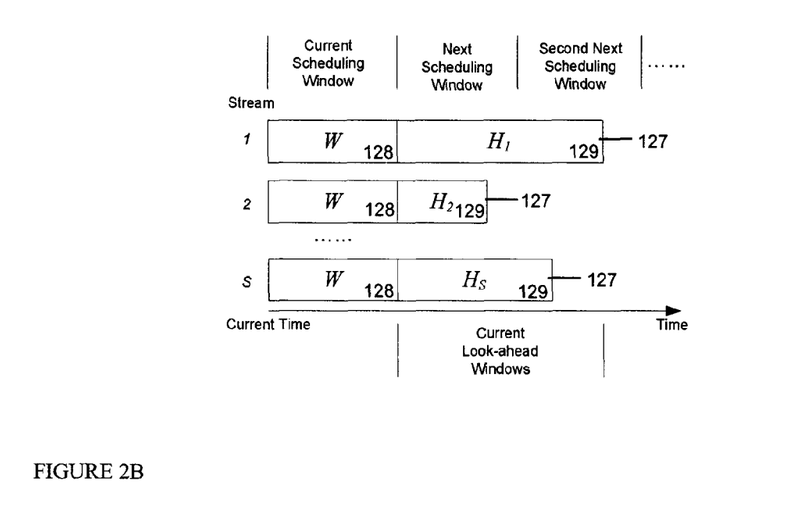
FIG. 2B is a block diagram of a scheduling window and look ahead window according to the invention.

Multiplexer 125 is shown in more detail in FIG. 2A. Multiplexer 125 receives several input streams, and produces a single output stream to broadcast network 130. Multiplexer 125 includes scheduler 210, which determines the schedule by which the video files and streaming video will be output. Let S be the number of video streams. Multiplexer 125 employs S separate receiving buffers 127 for individual video streams. Each receiving buffer 127 is further divided into two parts: a mandatory scheduling window 128 and an optional look-ahead window 129. As shown in FIG. 2B, the scheduling window 128 has a length of W seconds, which are common to all video streams. Multiplexer 125 uses a scheduling algorithm to compute a transmission schedule once every W seconds. The look-ahead window 129 of stream s has a length of $H_s$ seconds, which provides more information to the scheduling algorithm for further performance optimization. $H_s$ values can be different for different video streams. Pre-recorded videos usually have much longer look-ahead windows, while live videos often have shorter ones. Longer look-ahead windows, in general, provide more opportunity for optimization. Multiplexer 125 uses a scheduling algorithm and method as follows. Note that certain assumptions are made in calculating the algorithm.

Base station 120 transmits S video streams to mobile devices 140 over a broadcast network 130, which is a shared air medium with bandwidth R kbps. A video stream has a length of T seconds, in which each video stream has I frames, and is coded at F fps (frames-per-second). Therefore, T=I/F. Each frame i (1≤i≤I) of a VBR video stream s has a size of $l_i^s$ kb. Streams have instantaneous bit rates less than the bandwidth, i.e., $l_i^s$ F<R. For smooth playouts, each frame i should arrive at mobile device 140 no later than its decoding deadline of seconds. Base station 120 transmits every video stream s in bursts at a bit rate of R kbps. Therefore, once a burst of data is received, mobile devices 140 put their receiving circuits 340 into sleep mode until the next burst is received in order to save energy.

For preferred performance, both energy saving and goodput are achieved. Energy saving is defined as the ratio of time that mobile devices 140 can place their receiving circuits 340 into sleep mode to the total time, and the energy saving of video stream s is designated as $\gamma_s$. Therefore the system-wide energy saving is $\gamma=(\Sigma_{s=1}^{S}\gamma_s)/S$.

Goodput σ is defined as the fraction of the ontime transmitted data amount (which is the aggregate size of ontime bursts), over the maximum data amount offered by the air medium, which is TR kb. This definition only considers the video data transmitted before their decoding deadlines, as late video data cannot improve video quality.

Increased goodput leads to more concurrent video streams. As wireless spectrum is precious, concurrently streaming more video streams leads to higher profits for network operators. Energy consumption savings may be a secondary objective. Mobile devices are energy-limited and higher energy saving results in longer watch time, and thus higher user satisfaction. A burst schedule specifies for each burst the start time and its size for all video streams. The resulting schedule cannot have burst intersections, which happen when two bursts have nonempty intersection in time. Furthermore, the schedule must ensure that there are no buffer violation instances for any mobile device 140. A buffer violation occurs when a mobile device 140 has either no data in the buffer 350 to pass on to its decoder for playout (known as buffer underflow), or has no space to store data during a burst transmission (known as buffer overflow).

The number of bursts scheduled for video stream s, where 1≤s≤S, is defined as $n_s$. The start time of burst k of video stream s is $f_k^s$ seconds and the burst size is defined as $b_k^s$ kb, where 1≤k≤$n_s$. As the air medium has bandwidth R kbps, it takes $b_k^s$/R seconds to transfer burst k of stream s. The receiving circuits 340 of mobile device 140 are waken up earlier than the next burst time, because it takes some time to lock to the radio frequency and synchronize before the data can be demodulated. This time period is referred to as overhead duration $T_o$ seconds. The value of $T_o$ could be high in wireless networks, e.g., in mobile TV broadcast networks, $T_o$ typically ranges from 50 to 250 msec. As mobile devices 140 must turn on receiving circuits 340 $T_o$ seconds earlier than the burst, the receiving circuits 340 stay on between $[f_k^s - T_o, f_k^s + b_k^s/R)$ to receive burst k of stream s. Mobile device 140 has a receiver buffer 350 with a size of Q kb. Given the above notations, $c_k^s$ kb is defined as the buffer level of mobile devices 140 at the beginning of burst k of video stream s. Mathematically, $c_k^s$ is written as:

$$c_k^s = \max\left(0, \sum_{j=1}^{k-1} b_j^s - \sum_{i=1}^{h} l_i^s\right),$$

where h is the maximum positive integer such that $h/F \leq f_k^s$. This equation computes the volume difference between the received data (the first summation) in buffer 350 and the consumed data (the second summation) from buffer 350, and returns 0 if there is no received data in buffer 350. Schedule L is defined as a set of bursts: $\{<f_k^s, b_k^s> | 1 \leq s \leq S \text{ and } 1 \leq k \leq n_s\}$ for all video streams s.

The burst scheduling parameters for VBR streams is formulated as:

$$\text{Pri: } \max_L \sigma = \frac{\sum_{s=1}^{S} \sum_{j=1}^{n_s} b_j^s / R}{I/F}; \quad (1a)$$

$$\text{Sec: } \max_L \gamma = 1 - \frac{\sum_{s=1}^{S} \sum_{k=1}^{n_s} (T_o + b_k^s / R)}{I/F} \Big/ S; \quad (1b)$$

$$\text{s.t. } \left[f_k^s, f_k^s + \frac{b_k^s}{R}\right] \cap \left[f_{\tilde{k}}^{\tilde{s}}, f_{\tilde{k}}^{\tilde{s}} + \frac{b_{\tilde{k}}^{\tilde{s}}}{R}\right] = \emptyset; \quad (1c)$$

$$c_k^s > 0; \quad (1d)$$

$$c_k^s + b_k^s - \sum_{f_k^s \leq j/F < f_k^s + b_k^s/R} l_j^s \leq Q; \quad (1e)$$

With the above constraints, the primary goal is to maximize the goodput $\sigma$, which is the fraction of the ontime transmitted data amount, $\sum_{s=1}^{S} \sum_{j=1}^{n_s} b_j^s$, over the maximum data amount, $RT = RI/F$. The secondary goal is to maximize the energy saving $\gamma$, which is the fraction of time that mobile devices 140 can put receiving circuits 340 into sleep over the total time. Considering stream s, the aggregate receiving circuits 340 ontime is: $\sum_{k=1}^{n_s}(T_o + b_k^s/R)$ seconds, and the video length is I/F seconds. Therefore, the energy saving of stream s can be computed by:

$$1 - \frac{\sum_{k=1}^{n_s} (T_o + b_k^s/R)}{I/F}$$

Computing the average energy saving $\gamma$ among all video streams S provides the system-wide energy saving. The constraints in Equations (1c)-(1e) above provide that the resulting burst schedule is feasible. In particular, Equation (1c) provides that there are no burst intersections among all S video streams. Equation (1d) checks the buffer level for stream s at the start time of every burst to prevent buffer underflow instances. Equation (1e) validates the buffer level for stream s at the end time of every burst to prevent buffer overflow instances, and the third term (the summation) includes all frames that have deadlines during that burst. It is sufficient to check the buffer 350 level only at the burst start and end times, because the buffer 145 level of mobile devices increases if and only if there is a burst at that moment.

Scheduler 210 may implement the method using some or all of the constraints above. For example, an implementation could include only a single constraint: no burst intersection, and not use the other constraint of no buffer violation instances. This is achieved by using two separate buffers, B and B', so that B can be drained when B' is filled up, and B' can be drained when B is filled up. More specifically, receiver buffer 350 memory Q can be split into two equal sized buffers, and the sending time of video stream s is divided into $p_s$ disjoint time segments. A scheduling algorithm can properly send all S video streams, so that mobile devices of any video stream s in segment p, where $2 \leq p \leq p_s$, render the video data that have been received in segment p−1, and thus are free from buffer overflow instances. That is, mobile devices use a buffer for receiving (filling up) data and another buffer for decoding (draining) data in every time segment p, and they swap these two buffers upon reaching a new time segment p+1. Segments have different lengths in time due to the VBR nature of video streams, and their lengths are computed as follows.

Since each segment has a fixed receiver buffer size Q/2, only limited number of frames can be sent in each segment. For any video stream s and any segment p ($1 \leq p \leq p_s$), we let $m_p^s$ be the last frame (with the largest frame index) that gets included in segment p. $m_p^s$ can be computed by induction as:

$$m_0^s = 0 \text{ and } \sum_{j=m_{p-1}^s+1}^{m_p^s} l_j^s \leq \frac{Q}{2} < \sum_{j=m_{p-1}^s+1}^{m_p^s+1} l_j^s, \quad (2)$$

$$\forall 1 \leq p \leq p_s.$$

This induction stops once $m_{\hat{p}}^s$ for some integer $\hat{p}$, where $(m_{\hat{p}}^s - m_0^s)/F = (W + H_s)$. Once $m_p^s$ is determined, frames $[m_{p-1}^s + 1, m_p^s]$ are the maximum number of frames that can be fit in the receiving buffer of segment p, for $1 \leq s \leq S$ and $1 \leq p \leq p_s$. Letting $y_p^s$ be the aggregate data amount required for smooth playout in segment p, $y_p^s$ is:

$$y_p^s = \sum_{j=m_{p-1}^s+1}^{m_p^s} l_j^s. \quad (3)$$

Furthermore, mobile devices in segment p always render the data received in segment p−1. This means that the time length of segment p depends on the number of frames received in segment p−1, e.g., if 5 frames are received in the previous segment, the playout time of the current segment is 5/F seconds, where F is the frame rate. $x_p^s$ and $z_p^s$ are defined as the start and end times of segment p for video stream s. Then, $x_p^s$ and $z_p^s$ are:

$$x_1^s = 0 \text{ and } x_p^s = (m_{p-2}^s + 1)/F, 2 \le p \le p_s. \quad (4)$$

$$z_1^s = \sum_{s=1}^{S} y_1^s/R \text{ and } z_p^s = m_{p-1}^s/F, 2 \le p \le p_s. \quad (5)$$

Segments are defined in a very dynamic way: video streams with higher instantaneous bit rates get shorter segments, while others get longer segments. This allows multiplexer 125 to quickly adapt to the rate variations in VBR video streams, and use the receiving buffer B (or B'). In the first segment (p=1) of all video streams, mobile devices 140 have no data to playout and only receive and buffer data. Therefore, any segment length could be assigned to the first segment. To maximize the goodput and minimize the delay, the first segment size is $\Sigma_{s=1}^{S} y_1^s/R$, which is the shortest possible segment length to send data in the first segment of all video streams. Since $y_1^s \le Q/2$ (indicated by Equations (2) and (3)), the delay incurred by the method is bounded by:

$$d=(SQ)/(2R) \quad (6)$$

Using these notations, the scheduling problem is:

$$\text{Pri: } \max_L \sum_{s=1}^{S} \sum_{j=1}^{n_s} b_j^s; \quad (7a)$$

$$\text{Sec: } \max_L \sum_{s=1}^{S} n_s; \quad (7b)$$

$$\text{s.t. } \sum_{\forall x_p^s \le f_k^s < z_p^s} b_k^s; \quad (7c)$$

This formulation first maximizes the goodput by maximizing the amount of ontime delivered video data in Equation (7a). The formulation also maximizes the energy saving by minimizing the number of bursts in Equation (7b), as each burst incurs a constant overhead duration $T_o$. The constraint in Equation (7c) ensures that the aggregate size of scheduled bursts in every segment equals to the aggregate size of frames associated with that segment, which avoids buffer violation instances (both overflow and underflow).

Decision points t are defined as the time instances at which either a segment starts, i.e., at time $x_p^s$, or a segment exceeds its decoding deadline, i.e., at time $z_p^s$. At each decision point t, a burst is scheduled for the segment with the smallest end time $z_p^s$ among all outstanding segments p' with start time $x_p^s$ earlier than current time t, end time $z_p^s$, later than current time t, and its accumulated data amount less than the required amount $y_p^s$. The scheduling method builds a schedule for the scheduling window, while using the frame size information in both scheduling and look-ahead windows.

A pseudo code version of an algorithm used by multiplexer 125 is:

1. // Input: multiple VBR streams.
2. // Output: burst transmission schedule for the scheduling window (with size W).
3. // transform
4. for s =1 to S {
5.   generate the segments for s and determine $x_p^s$, $y_p^s$, and $z_p^s$ using Eqs. (2)-5), where $1 \le p \le P_s$, and $m_{P_s}^s = (W + H_s)F + m_0^s$
6.   push start time $x_p^s$ and end time $z_p^s$ of each segment into a priority queue D of decision points, which is sorted in ascending order of time
7. }
8. // burst scheduling
9. for each decision point in D {
10.   assume the current decision point belongs to segment p of stream s
11.   if there is no segment p' with $x_{p'}^s \le t$ and $z_{p'}^s > t$, and t is the current time, push a slack time slot into the slack time list ST
12.   else schedule a burst from times t to $t_e = \min(z_p^s, t_m, t_n)$ for s, where segment p of s has the smallest $z_p^s$ among all segments p' with $x_{p'}^s \le t$ and $z_{p'}^s > t$, $t_m$ represents the time segment p is completed, and $t_n$ is the time of the next decision point
13.   if segment p is not complete and $t_e = z_p^s$ // segment p is late
14.     allocate one or more bursts to stream s using slack time slots in ST
15.   let $t = t_e$ // advance the current time
16. }
17. return burst schedules in the scheduling window The above algorithm enables statistical multiplexing of live and pre-recorded VBR video streams in an efficient manner, and it is referred to herein as MuxVBR. The algorithm uses the frame size information in the receiving buffers to create segments for each video stream in lines 4-7. The start and end times of each segment are pushed into a priority queue in line 6. The for-each loop between lines 9 and 16 uses this priority queue to traverse through all decision points in ascending order of time. Line 11 keeps track of any slack time using a list, and if there is any data to send, line 12 allocates a transmission burst for as long as possible. There are three cases, where the burst transmission would stop: (i) if the end time of the current segment is reached (z), (ii) if the current segment is completed ($t_m$), and (iii) if the next decision point is reached. Line 13 checks whether the last segment is completely transmitted. If not, at line 14, some slack time slot is assigned to the stream that did not meet the required data amount. This is to prevent buffer underflow at a later time using other idling resources. Resulting burst schedules for the scheduling window are returned in line 17.

Figure 4:
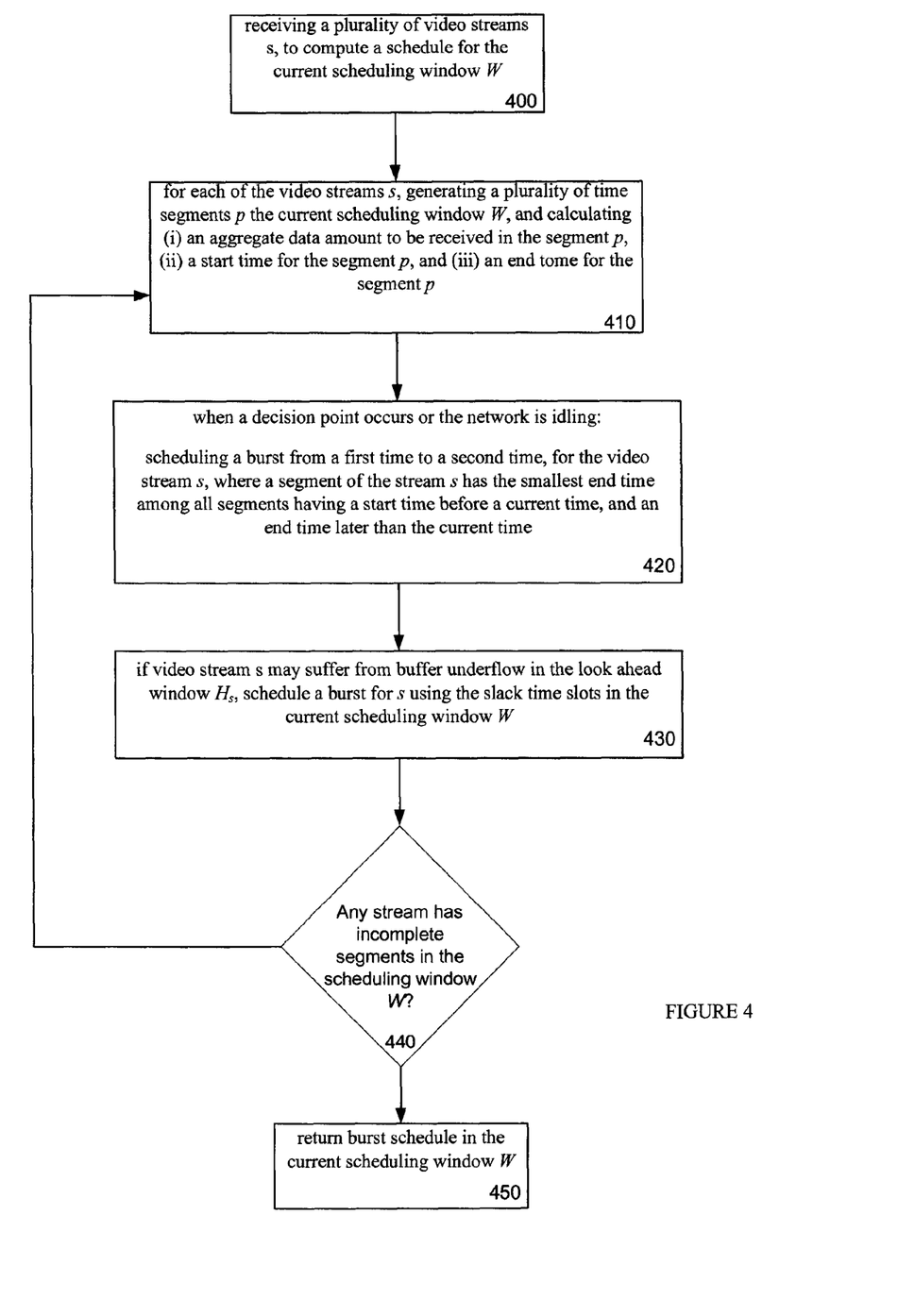
FIG. 4 is a flowchart depicting operation of a method according to an embodiment.

FIG. 4 shows a flow chart of an implementation of the algorithm. At step 400, a plurality of video streams s are received for a current scheduling window W. At step 410, for each video stream, a plurality of time segments p are generated in the current scheduling window W, and an aggregate data amount to be received in each segment p, a start time for each segment p and an end time for each segment p, are calculated.

A step 420, when either a decision point D occurs or the network is idling, a burst is scheduled for a video stream s, where the segment p of the video stream s has the smallest end time among all segments p having a start time before the current time, and an end time later than the current time. At step 430, if a video stream s suffers from buffer underflow in the look-ahead window $H_3$, then a burst is scheduled for s using the slack time slots in the current scheduling window W. Finally, if all segments p have been scheduled for the scheduling window W, then the burst schedule is returned at step 440. If incomplete segments in the scheduling window are present, then return to step 410.

The above algorithm considers a small scheduling window W (in the order of a few seconds), and it can be used as an online scheduling method. In addition, the algorithm can handle the dynamic nature of video service. For example, video streams can be added to (or removed from) the broadcast and they will automatically be considered for transmission in the following scheduling window. The for-loop in lines 4-7 will be called on the new set of video streams and bursts will be continually scheduled with no interruptions or running-time penalty. Finally, the algorithm does not need joint video coders, can work with any VBR streams, and imposes no limitations on the video coders for rate control.

Hence, it allows video coders to encode video streams with the maximum coding efficiency, and thus achieve the best streaming quality.

The method according to the invention produces feasible burst schedules for closed-loop networks, which employ joint rate allocators to encode multiple videos into VBR streams so that the aggregate bit rates of video streams do not exceed the bandwidth of their broadcast networks. It also produces feasible burst schedules for open-loop networks that do not use joint rate allocators.

The MuxVBR algorithm produces burst schedules that are optimal in terms of goodput, and near-optimal in terms of energy saving. The approximation gap for the energy saving performance metric is: $\Delta\gamma=\gamma^*-\gamma \leq rT_0/Q$, where $\gamma^*$ and $\gamma$ are the system-wide energy saving achieved by an optimal scheduling algorithm and by the method according to the invention, respectively, and r represents the average coding bit rate across all video streams. In addition, the algorithm produces glitch-free burst schedules in closed-loop broadcast networks. Moreover, the approximation gap of energy saving has some desirable properties. First, the gap decreases when the overhead duration $T_o$ decreases, which is expected as hardware technology advances. Second, the gap decreases when the receiver buffer 350 size Q increases. The receiver buffer 350 size increases whenever the unit price of memory chips reduces, which has been a trend for several years. Last, the gap decreases when the average coding bit rate r reduces, which is likely to happen as newer coding standards achieve higher coding efficiency, and thus lower coding bit rates. These properties show that the method will produce improved results as the technology advances.

Figure 5:
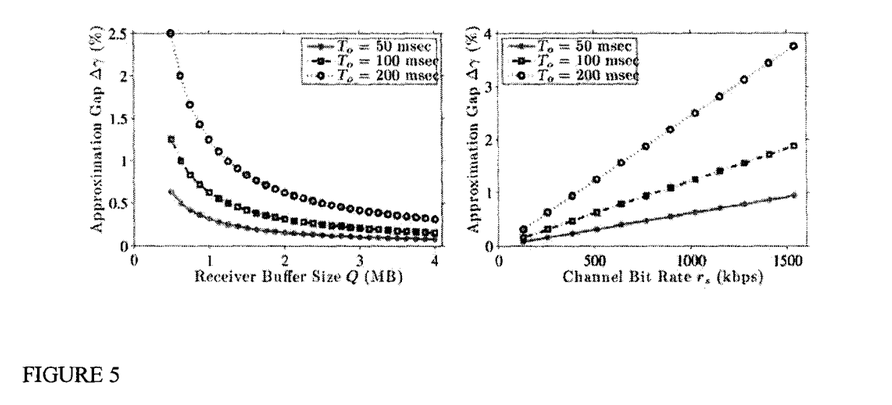
FIG. 5 shows two graphs depicting an example of an approximation gap using real parameters when using the method of FIG. 4.

To illustrate the energy saving performance of the method using current technology, the approximation gap can be analyzed using a range of practical parameters. Considering overhead duration from 50 to 200 msec, receiver buffer size from 256 KB to 4 MB, and coding bit rate from 128 to 1536 kbps, the numerical results are shown in FIG. 5. FIG. 5(*a*) shows that the gap becomes very small if the receiver has a reasonable buffer size, e.g., the gap is less than 1.5% if receiver buffer is larger than 1 MB. FIG. 3(*b*) illustrates that the gap becomes smaller when coding bit rate is smaller, e.g., the gap is less than 1.25% for coding bit rate of 512 kbps and below. Notice that 512 kbps is high enough for video streaming to mobile devices, because these devices typically have small display resolutions. These two figures confirm that the method according to the invention achieves a very small approximation gap on energy saving with current technology.

The delay incurred by the method is bounded by (SQ)/(2R), as shown in Eq. (6). For illustration, using common network parameters, for example, the air medium bandwidth R=10 Mbps, receiver buffer size Q=2 Mb, and stream coding rate is 512 kbps. If a service provider broadcasts five video streams, its delay is less than 500 msec which is negligible. For a service provider who saturates the bandwidth and broadcasts 20 video streams, the delay is no more than 2 seconds.

Compared to open-loop broadcast networks, a closed-loop broadcast network uses additional components, such as a joint rate allocator, and several joint-coding enabled video coders. Therefore, open-loop broadcast networks are less expensive to deploy, and thus are more suitable to small scale network operators such as local TV stations, temporary base stations, and startup broadcast companies with limited budgets. The method according to the invention can be used in open-loop broadcast networks. The method returns glitch-free burst schedules, i.e., leads to no buffer violation instances in open-loop broadcast network if the aggregate bit rate of all video streams does not exceed the broadcast network bandwidth, i.e., $\Sigma_{s=1}^{S}l_i^s \leq R/F$, for all $1 \leq i \leq I$.

Fortunately, for small scale network operators, not too many video streams need to be broadcast. Therefore, these network operators are unlikely to saturate the network bandwidth. Hence, these network operators may implement the method according to the invention in the multiplexers without purchasing expensive joint video coders. When the aggregate bit rate of the video streams instantaneously exceeds the network bandwidth, the method according to the invention will minimize the number of glitches in open-loop networks, by scheduling as much data as possible.

Several simulations and real video traces have been used to evaluate the method disclosed herein in open-loop and closed-loop networks.

Many commercial multiplexers implement two burst scheduling schemes: slotted and dynamic scheduling. Network operators use these two schemes to broadcast VBR streams, which can be used with three algorithms, which are referred to as: $VBR_\alpha$, $RVBR_\beta$, and $DVBR_\tau$.

A trace-driven simulator for broadcast networks was implemented. The simulator took trace files of real VBR coded streams as inputs and simulated both open- and closed-loop networks. In an open-loop network, a 16-QAM modulation scheme was used, with a 5/6 channel coding rate, 1/8 guard interval, and 5 MHz channel bandwidth. This provided a broadcast network with bandwidth R=17.2 Mbps. The overhead duration was $T_o$=100 msec and receiver buffer size Q=4 Mb (=0.5 MB). To saturate network bandwidth, the simulation concurrently broadcast up to 20 VBR video streams, where each stream has different characteristics. 20 trace files were downloaded from a Video Trace Library [Seeling et al. 2004] for CIF video streams coded by H.264/AVC coders at 30 fps. A 60-min trace was constructed by starting from a random time and wrapping around if the end of the original coded stream is reached. The frame sizes of each video stream were scaled so that it had a random average bit rate between 100 to 1250 kbps. These generated a set of video trace files with diverse and varying video characteristics to mimic the video streams broadcast in real open-loop networks.

To cover all possible burst schedules that can be used in current base stations, the $\alpha$ value of the $VBR_\alpha$ algorithm was varied from 48% to 98% and the $\beta$ value of the $RVBR_\beta$ algorithm was varied from 1 to 64 seconds. If not otherwise specified, 20 video streams were concurrently broadcast for 60 min using each burst scheduling algorithm, and three performance metrics were calculated: missed frames, number of concurrent video streams, and energy saving.

The missed frames include video frames that cannot be broadcast due to shortage of bandwidth reserved to video streams, and frames that are late and cannot be decoded. The missed frame ratio was defined as the number of missed frames to the number of total frames, which is an important Quality of Service (QoS) metric because higher missed frame ratios result in more playout glitches that are annoying to users. The number of concurrent video streams was defined as the number of streams that can be broadcast by each scheduling algorithm without resulting in too many missed frames. More precisely, a target missed frame ratio was selected using different scheduling algorithms. 20 video streams were broadcast using the considered scheduling algorithms for 60 minutes. For each algorithm, the average missed frame ratio was computed over the whole broadcast period. If the average missed frame ratio was higher than the target ratio, the number of concurrently broadcast video streams was reduced by one and the 60-min broadcast repeated, until the target missed frame ratio was achieved. At each iteration, the video stream with the smallest bit rate was dropped as video streams with lower bit rates may be less important, and dropping them earlier may provide higher goodput.

The method was also tested in closed-loop networks. The network parameters used were as the preceding paragraph. The simulator jointly encoded 10 VBR video streams, based on the video traces from a Video Trace Library [Seeling et al. 2004]. The simulator employs Lagrangian optimization method [Sullivan and Wiegand 1998] to maximize the average video quality under the bandwidth constraint. It then concurrently broadcasts these coded streams for 60 minutes using various scheduling algorithms. The method according to the invention and the $DVBR_\tau$ algorithm were compared, and the $\tau$ value was varied from 1 to 2 seconds. For all algorithms, energy saving was computed for each channel.

Figure 6:
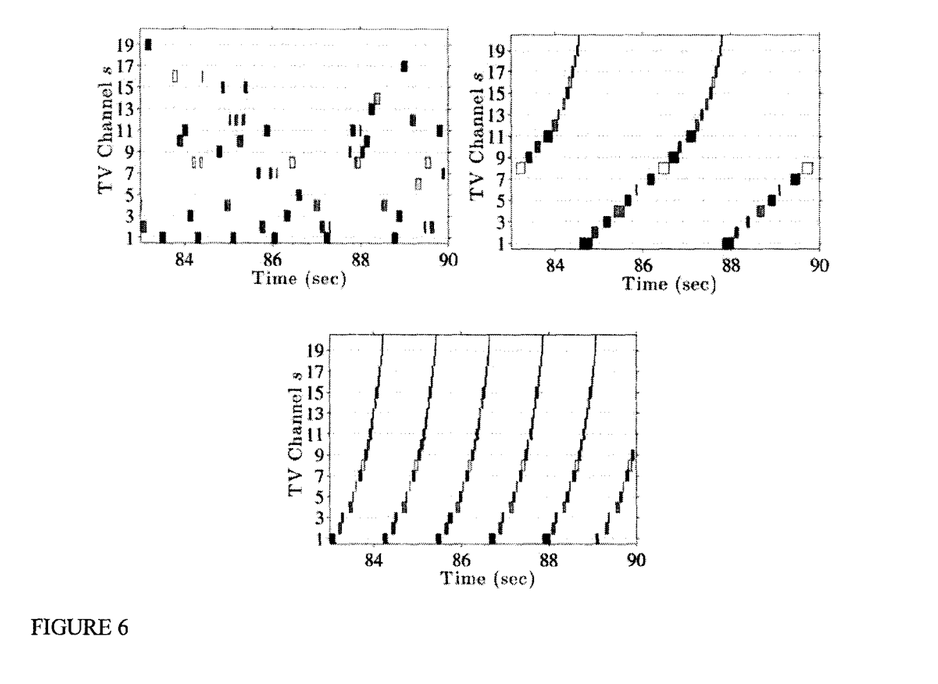
FIG. 6 shows three graphs depicting the burst schedules produced by different scheduling algorithms.

The burst schedules computed by each considered algorithms were plotted in FIG. 6 to visually validate their correctness. A short period of 7 seconds was observed; burst schedules during other time periods were similar. The bursts scheduled by the method according to the invention were in variable size and in various frequencies. This is because the method quickly adapts to the instantaneous bit rate variations of VBR streams. In contrast, the current algorithms, both $VBR_\alpha$ and $RVBR_\beta$, schedule bursts in a round-robin fashion. Thus, they contain slack time, e.g., the air medium is idle around the time 86 seconds in FIG. 6(b). This means they are not optimal in terms of goodput. Also, due to the round-robin nature of current algorithms, video streams with lower bit rates, such as stream 20 in FIG. 6(c), have very short bursts, which lead to low energy saving. Therefore, current scheduling algorithms are not optimal in terms of energy saving.

Figure 7:
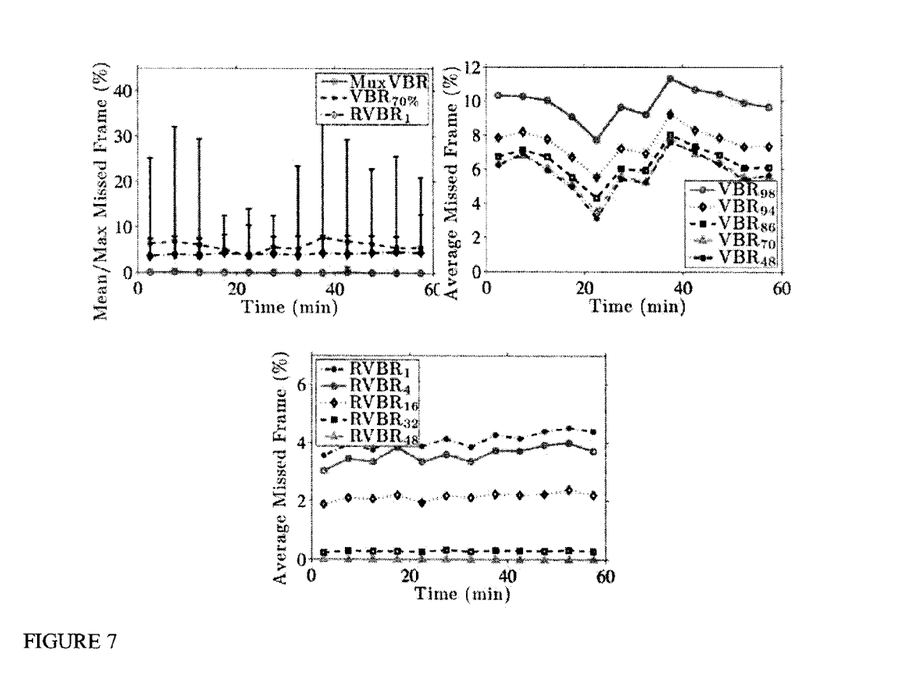
FIG. 7 shows three graphs depicting missed frame ratios by different scheduling algorithms.

The mean and maximal missed frame ratios of all video streams in 5-min intervals were computed for the considered algorithms, as shown in FIG. 7(a), which shows that the method according to the invention produces almost no missed frames, while $VBR_\alpha$ results in up to 33% missed frame ratio and $RVBR_\beta$ leads to up to 12% missed frame ratio. This leads to unacceptable QoS: a playout glitch every 1 and 3 seconds for $VBR_\alpha$ and $RVBR_\beta$, respectively. This experiment shows that the SMS algorithm results in much better perceived quality.

Next, the $\alpha$ and $\beta$ values were varied and the missed frame ratio computed for each of them. The method according to the invention does not depend on $\alpha$ and $\beta$, and as indicated by FIG. 7(a) it produces almost no missed frames. The results of $VBR_\alpha$ algorithm were plotted with different $\alpha$ values in FIG. 7(b). This figure reveals that changing the $\alpha$ value does not solve the QoS issue at all: at least 4% of missed frame ratio is observed no matter what $\alpha$ value is used. This means that even if network operators exhaustively try all possible $\alpha$ values with the current $VBR_\alpha$ algorithm, no burst schedule with acceptable QoS is possible. Then, the results of the $RVBR_\beta$ algorithm were plotted with various $\beta$ values in FIG. 7(c). This figure shows that the average missed frame ratio decreases when the preroll delay of the $RVBR_\beta$ algorithm increases. The preroll delay is the initial time a user has to wait before starting to play the video stream. However, a preroll delay of 48 seconds is required for a zero average missed frame ratio. Unfortunately, a 48-second preroll delay significantly degrades user experience, and thus is not acceptable for mobile video services. Therefore, the current $RVBR_\beta$ algorithm has difficulties achieving acceptable QoS.

Figure 8:
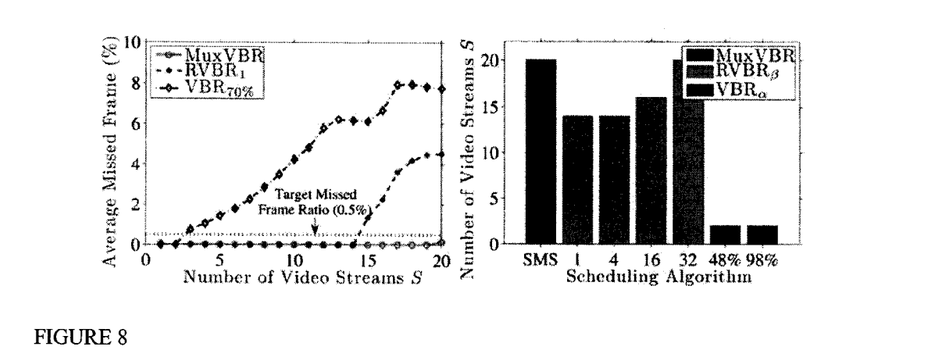
FIG. 8 shows two graphs depicting the missed frame ratios by different scheduling algorithms with varying amounts of video streams.

FIG. 8 shows a study of how many video streams the burst scheduling algorithms can concurrently broadcast for a given QoS target: 0.5% missed frame ratio. The number of concurrent video streams was iteratively reduced as outlined above, and the missed frame ratio computed at each step. The average missed frame ratio was plotted throughout the broadcasts in FIG. 8(a). This figure shows that while the SMS algorithm can result in the concurrent broadcast of 20 video streams, the $RVBR_1$ algorithm can only broadcast 14 video streams and the $VBR_{70\%}$ algorithm can only broadcast 2 video streams. In FIG. 8(b), the maximum number of video streams that can be concurrently broadcast is plotted by each scheduling algorithm. This figure shows that no matter what $\alpha$ value is used in the $VBR_\alpha$ algorithm, it can only broadcast 2 video streams. Moreover, a $\beta$ value larger than 16 is required for the $RVBR_\beta$ to achieve the same number of video streams as the SMS algorithm, which significantly degrades user experience due to its excessive preroll delay of 32 seconds. This experiment shows that the SMS algorithm allows network operators to broadcast many more video streams under the same QoS requirements, which leads to higher revenues.

Figure 9:
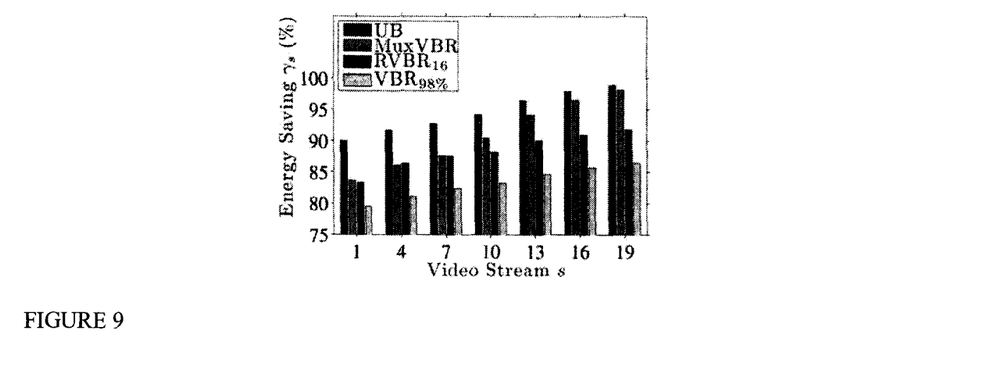
FIG. 9 shows a graph depicting energy savings achieved by various burst scheduling algorithms.

The energy saving achieved by the method according to the invention was compared to the current burst scheduling algorithms. A very conservative upper bound on the maximum achievable energy saving was used as a comparison. This upper bound was used because the burst scheduling problem is NP-Complete, and computing the exact optimal solutions may take long time. The upper bound was computed as follows. For each video stream, only this stream was broadcast without any other streams for 60 minutes. The resulting schedule achieves maximum energy saving by allocating the largest possible bursts that can fit in receiver's buffer 350. The receiving circuits 340 of mobile devices 140 are put into sleep after getting a burst until that burst is completely consumed. Clearly, the schedule leads to a conservative upper bound on the energy saving, and this upper bound was denoted as UB in FIG. 9. The experiment was repeated for 20 times: once for every video stream. Then, the algorithms were used to compute the burst schedules for all 20 video streams concurrently. Sample energy saving achieved by different burst scheduling algorithms are reported in FIG. 9; results for other video streams are similar. The method according to the invention achieves near-optimal energy saving: as close as 2% lower than the conservative upper bound, and up to 7%; and achieves higher energy saving than the current $VBR_{98\%}$ and $RVBR_{16}$ with a margin as high as 12% and 5%, respectively. This experiment shows that the method according to the invention achieves energy saving that is very close to optimal, and is better than that of the current scheduling algorithms in open-loop networks.

Figure 10:
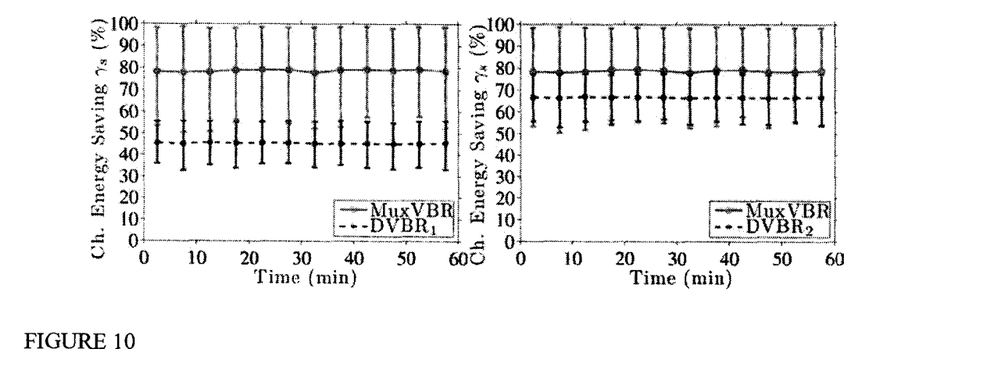
FIG. 10 shows two graphs depicting per-channel energy savings between two different scheduling algorithms.
Figure 11:
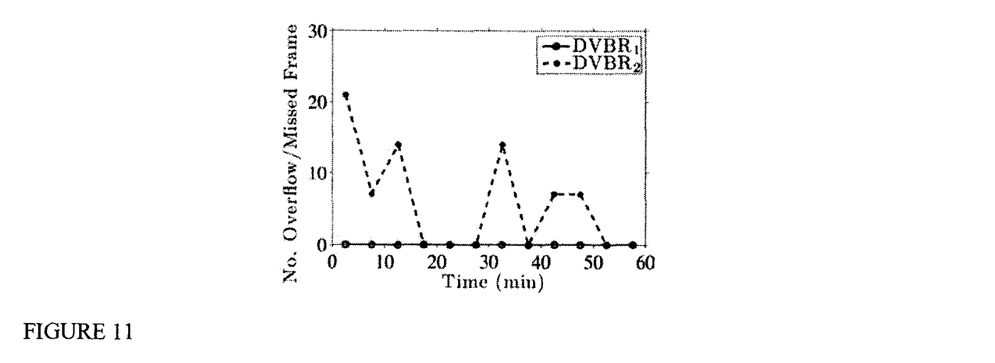
FIG. 11 shows a graph depicting overflow and missed frames using the $DVBR_2$ algorithm.

The performance of the method according to the invention was compared to the current burst scheduling algorithms in closed-loop networks. The mean, maximum, and minimum per-channel energy saving of the method and $DVBR_\tau$ algorithm are shown in FIG. 10. The method according to the invention constantly results in higher energy saving than the current algorithm. For example, FIG. 10(a) shows that the method achieves about 80% average energy saving at all time, while the $DVBR_1$ algorithm only achieves about 45%. The $DVBR_\tau$ algorithm achieves higher energy saving when $\tau$ increases. For example, FIG. 10(b) reveals that the $DVBR_2$ algorithm achieves about 65% energy saving on average, which is better than that of $DVBR_1$. However, higher $\tau$ value may result in lost frames due to buffer overflow on mobile devices, which in turn lead to playout glitches, and thus cannot be used in commercial base stations. To understand whether $DVBR_2$ produces a glitch-free burst schedule in the simulation, the number of missed frames was plotted in FIG. 11. This figure shows that while $DVBR_2$ results in higher energy saving than $DVBR_1$, it also leads to playout glitches. This experiment illustrates that the current $DVBR_\tau$ algorithm leads to low energy saving in closed-loop networks, and using the system according to the invention can improve the average energy saving by about 80%/45%≈1.7 times.

Also the running time of the method according to the invention was tested on a commodity PC with a 2.33 GHz processor and running Linux. The method took less than 1 second to construct the burst schedule for the 60 min simulation. This clearly shows that the method incurs negligible processing overhead, and can run in real time.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods and algorithms described above may omit some acts, include other acts, or execute acts in a different order than set out in the illustrated embodiments.

The present algorithms, methods, systems and articles also may be implemented as a computer program product that comprises a computer program mechanism embedded in a computer readable storage medium. For instance, the computer program product could contain program modules for installing and operating the applications described above. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and applications via the use of examples. Insofar as such examples contain one or more functions or operations, it will be understood by those skilled in the art that each function or operation within such examples can be implemented, individually and/or collectively, by a wide range of hardware, software, firmware, or virtually any combination thereof. In one embodiment, the present subject matter may be implemented via Application-Specific Integrated Circuits (ASICs). However, those skilled in the art will recognize that the embodiments disclosed herein, in whole or in part, can be equivalently implemented in standard integrated circuits, as one or more computer programs running on one or more computers, as one or more programs running on one or more controllers (e.g., microcontrollers) as one or more programs running on one or more processors (e.g., microprocessors), as firmware, or as virtually any combination thereof, and that designing the circuitry or writing the code for the software and or firmware would be well within the skill of one of ordinary skill in the art in light of this disclosure.

In addition, those skilled in the art will appreciate that the applications taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

Further, in the methods taught herein, the various acts may be performed in a different order than that illustrated and described. Additionally, the methods can omit some acts, and/or employ additional acts.

The system and methods can be used: (i) for broadcasting video streams over WiMAX networks, (ii) for broadcasting video streams over 3G/4G wireless networks, (iii) for broadcasting video streams over DVB-H and ATSC networks, (iv) in small-scale video broadcasting networks to mobile devices such as in museums and stadiums, and (v) for video broadcasting of VBR streams without expensive video transcoders, amongst other uses.

The present embodiments allow network operators to broadcast more high quality video streams. The system and method according to the invention also provide energy saving for mobile devices.

The system and method provided leverages the characteristics (the bit size of each video frame) of pre-recorded video streams, which are known at the broadcast time. Effective transmission schedules for these streams are then created. Knowing the characteristics of video streams enables the method to further optimize the base station, for example video data can be transmitted before its deadline when there is a slack capacity in the wireless medium. Early transmission frees the wireless medium for later time periods, which can absorb spikes in the bit rates of video streams without incurring reduction in quality or glitches.

The system and method may also be used to broadcast a mix of live (e.g. sports events) and pre-recorded video streams (e.g. television episodes). In such a case, the characteristics of pre-recorded streams can be determined for longer look-ahead windows, since the entire pre-recorded streams are available before the broadcast time. Using these characteristics, the transmission of the pre-recorded streams (with known future bit rate requirements) can be arranged around the transmission of live streams, which may have fluctuating bit rates that cannot be known in advance. For example, if there is slack capacity of the wireless bandwidth after transmitting all needed video data for the current scheduling window, some video data from the pre-recorded streams can be transmitted ahead of time using this slack capacity. This frees up some additional capacity in future scheduling windows, which can be used to accommodate the variability in the bit rates of the live video streams.

The system and method according to the embodiments allows a multiplexer in a broadcast network that transmits VBR streams to provide the following: (1) Streaming Quality Video streaming is a real-time application, and multiplexers may ensure that there are no buffer violation instances on mobile devices. A buffer violation occurs when the receiver of a video stream either: (i) has no data in the buffer to play out (buffer underflow), or (ii) has no space to store the received data (buffer overflow); (2) Energy Consumption: Higher energy consumption leads to shorter viewing time before users replace or recharge their batteries, and more toxic waste of primary (non-rechargeable) or rechargeable batteries. Multiplexers may reduce the energy consumption of mobile devices to increase user satisfaction and reduce pollution; (3) Goodput: The wireless spectrum is expensive, and to be commercially viable, network operators must achieve high goodput in their wireless networks. The goodput refers to the fraction of the amount of video data delivered on time over the network capacity. Higher goodput in general leads to more concurrently broadcast video streams within a given spectrum, and thus higher net profits of network operators; (4) Dynamic Adaptation: The video broadcast service is quite dynamic, with the number and characteristics of the set of video streams constantly changing according to the schedule of the broadcast service. In addition, commercial breaks and inserted video segments (e.g. video clips inserted within a news stream) increase the variability of the bit rate requirements to broadcast video streams. A transmission scheduling algorithm is provided to dynamically adapt to these changes to maintain high quality.

Specific embodiments have been shown and described herein. However, modifications and variations may occur to those skilled in the art. All such modifications and variations are believed to be within the scope and sphere of the present embodiments.

The invention claimed is:

1. A method of transmitting a live video stream and a pre-recorded video stream over a wireless network to a mobile device, the method comprising:
   receiving the live video stream and the pre-recorded video stream for a current scheduling window;
   dividing the live video stream and the pre-recorded video stream into segments in the current scheduling window, each segment including an aggregate data amount, a transmission start time and a transmission end time;
   determining a transmission schedule for the current scheduling window, said transmission schedule including the segments;
   locating slack time slots, the slack time slots being time slots for which no segment is allocated; and
   scheduling bursts associated with the pre-recorded video stream in the slack time slots, wherein the start time and transmission end time of the segments is placed in a queue,
   for each decision point in said queue:
   1) at a current time, if there is no segment that has a respective start time earlier than the current time, and a respective transmission end time later than the current time, then placing a slack time slot on a slack time list; else
   2) scheduling a burst from said current time to a second time, for a video stream s, wherein a segment of said stream s has the smallest transmission end time among all segments for said stream s having a respective start time before the current time, and a respective transmission end time later than the current time; and
   3) if a segment is not complete or is late, allocating a burst to stream s associated with said incomplete segment to a slot on said slack time list.

2. A method as claimed in claim 1, wherein the scheduling window is approximately a few seconds.

3. A method as claimed in claim 1, wherein the queue is sorted by time order.

4. A method as claimed in claim 1, wherein the slack time slot is located by: at a current time, if there is no segment that has a respective start time earlier than the current time, and a respective transmission end time later than the current time, then the slack time slot is placed on a slack time list.

5. A method of scheduling a plurality of video streams for transmission over a wireless network to a mobile device, comprising:
   a) receiving said plurality of video streams;
   b) for each of said video streams s generating a plurality of segments p for video stream s, and calculating (i) an aggregate data amount to be received in said segment, (ii) a start time for said segment; and (iii) an end time for said segment;
   c) placing said start time and end time for each of said segments in a queue, said queue sorted by time order;
   d) for each decision point in said queue:
      d.1) at a current time, if there is no segment that has a start time earlier than the current time, and an end time later than the current time, then placing a slack time slot on a slack time list; else
      d.2) scheduling a burst from said current time to a second time, for a video stream s, wherein a segment of said stream s has the smallest end time among all segments for said stream s having a start time before the current time, and an end time later than the current time;
      d.3) and if a segment is not complete or is late allocating a burst to stream s associated with said incomplete segment to a slot on said slack time list;
   e) returning a burst schedule for a scheduling window.

6. The method of claim 1 wherein a last frame $m_p^s$ for each stream s and each segment p is calculated as:

$$m_0^s = 0 \text{ and } \sum_{j=m_{p-1}^s+1}^{m_p^s} l_j^s \le \frac{Q}{2} < \sum_{j=m_{p-1}^s+1}^{m_p^s+1} l_j^s,$$

$$\forall\, 1 \le p \le p_s$$

wherein Q is a capacity of a receiver buffer in said mobile device, $l_j^s$ is a frame j, of video stream s.

7. The method of claim 6 wherein said start time $x_p^s$ for each of said streams s and each of said segments p, is calculated as:

$$x_1^s = 0 \text{ and } x_p^s = (m_{p-2}^s + 1)/F, 2 \le p \le p_s$$

wherein F is a frame rate of said stream.

8. The method of claim 7 wherein said end time $z_p^s$ for each of said streams s and each of said segments p, is calculated as:

$$z_1^s = \sum_{s=1}^{S} y_1^s / R \text{ and } z_p^s = m_{p-1}^s / F,\, 2 \le p \le p_s$$

wherein R is the bandwidth of said network.

9. The method of claim 8 wherein said aggregate data amount $y_p^s$ for each of said streams s and each of said segments p, is calculated as:

$$y_p^s = \sum_{j=m_{p-1}^s+1}^{m_p^s} l_j^s.$$

10. The method of claim 5 wherein said decision point is one of:
   said start time for said segment p begins, or
   said end time for said segment p is reached.

11. The method of claim 5 wherein a segment p is complete if it has equaled or exceeded said aggregate data amount for said segment p.

12. The method of claim 5 wherein a segment p is late if said current time is later than said end time and said aggregate data amount for said segment p has not been reached.

13. The method of claim 10 wherein said mobile device comprises a receiving circuit, and said receiving circuit is actuated in anticipation of receipt of a burst.

14. The method of claim 5 wherein said video streams are variable bit rate video streams.

15. The method of claim 14 wherein said video streams are transmitted to said mobile device without a joint video coder, rate allocator, or transcoder.

16. The method of claim 5 wherein said slack time list is used to transmit segments of video stream s prior to a deadline.

17. The method of claim 5 wherein said scheduling window includes a look-ahead window, said look-ahead window having a greater length for pre-recorded video streams than for live video streams.

18. The method of claim 5 wherein said method is simulated to determine if a given wireless bandwidth can accommodate broadcast of a predetermined number of said video streams and a resulting video quality.

19. The method of claim 5 wherein said wireless network is of a type selected from the group consisting of: DVB-H; ATSC-M/H; WiMAX; 3G/4G; or DVB-SH.

20. A multiplexer for scheduling transmission of a plurality of video streams s over a wireless network to a mobile device comprising,
- a scheduler, said scheduler scheduling said video streams s for transmission over said broadcast network to said mobile device by:
  - a) for each of said video streams s generating a plurality of segments p for video stream s, and calculating (i) an aggregate data amount to be received in said segment, (ii) a start time for said segment; and (iii) an end time for said segment;
  - b) placing said start time and end time for each of said segments in a queue, said queue sorted by time order;
  - c) for each decision point in said queue:
    - c.1) at the current time, if there is no segment that has a start time earlier than the current time, and an end time later than the current time then placing a slack time slot on a slack time list; else
    - c.2) scheduling a burst from a said current time to a second time, for a video stream s, wherein a segment of said stream s has the smallest end time among all segments for said stream s having a start time before the current time, and an end time later than the current time;
    - c.3) and a segment is not complete or is late, allocating a burst for stream s associated with said incomplete segment to a slot on said slack time list;
  - d) return a burst schedule for a scheduling window for transmission by said multiplexer.

* * * * *